(12) United States Patent
Vibhor et al.

(10) Patent No.: US 11,550,670 B2
(45) Date of Patent: *Jan. 10, 2023

(54) AUTOMATION OF DATA STORAGE ACTIVITIES

(71) Applicant: Commvault Systems, Inc., Tinton Falls, NJ (US)

(72) Inventors: Anand Vibhor, Manalapan, NJ (US); Amey Vijaykumar Karandikar, Long Branch, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,000

(22) Filed: May 7, 2021

(65) Prior Publication Data

US 2021/0334170 A1 Oct. 28, 2021

Related U.S. Application Data

(63) Continuation of application No. 17/023,833, filed on Sep. 17, 2020, now Pat. No. 11,030,059, which is a
(Continued)

(51) Int. Cl.
*H04L 29/08* (2006.01)
*G06F 11/14* (2006.01)
(Continued)

(52) U.S. Cl.
CPC ........ *G06F 11/1464* (2013.01); *G06F 9/5072* (2013.01); *G06Q 10/06316* (2013.01);
(Continued)

(58) Field of Classification Search
CPC ... G06F 11/1464; H04L 47/70; H04L 67/1097
See application file for complete search history.

(56) References Cited

U.S. PATENT DOCUMENTS

| 4,084,231 A | 4/1978 | Capozzi et al. |
| 4,267,568 A | 5/1981 | Dechant et al. |
| (Continued) |

FOREIGN PATENT DOCUMENTS

| EP | 0259912 | 3/1988 |
| EP | 0405926 | 1/1991 |
| (Continued) |

OTHER PUBLICATIONS

Arneson, "Mass Storage Archiving in Network Environments" IEEE, Oct. 31-Nov. 1998, pp. 45-50.
(Continued)

*Primary Examiner* — Adnan M Mirza
(74) *Attorney, Agent, or Firm* — Knobbe, Martens, Olson & Bear, LLP

(57) ABSTRACT

A system receives data storage workflow activities that include computer-executable instructions for carrying out data storage workflow in a network data storage system. Once the workflow is received, the system deploys the workflow to one or more workflow engines that can execute the various data storage activities related to the workflow. Prior to executing a data storage activity, the system can determine which workflow engine to use based on an allocation scheme.

18 Claims, 10 Drawing Sheets

Related U.S. Application Data continuation of application No. 16/438,332, filed on Jun. 11, 2019, now Pat. No. 10,824,515, which is a continuation of application No. 15/017,250, filed on Feb. 5, 2016, now abandoned, which is a continuation of application No. 13/787,152, filed on Mar. 6, 2013, now Pat. No. 9,292,815.

(60) Provisional application No. 61/615,037, filed on Mar. 23, 2012.

(51) Int. Cl.
    *G06Q 10/06*     (2012.01)
    *G06Q 10/10*     (2012.01)
    *G06F 9/50*      (2006.01)
    *H04L 47/70*     (2022.01)
    *H04L 67/1097*   (2022.01)

(52) U.S. Cl.
    CPC ............ *G06Q 10/10* (2013.01); *H04L 47/70* (2013.01); *H04L 67/1097* (2013.01); *G06F 2201/84* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,937,388 A * | 8/1999 | Davis ............... G06Q 10/06316 714/15 |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,589,336 B1 | 11/2013 | Levy et al. |
| 8,667,495 B1 | 3/2014 | Brandwine et al. |
| 8,856,483 B1 | 10/2014 | Paterson-Jones et al. |
| 8,930,497 B1 | 1/2015 | Holmes et al. |
| 8,954,446 B2 | 2/2015 | Vijayan Retnamma et al. |
| 9,020,900 B2 | 4/2015 | Vijayan Retnamma et al. |
| 9,098,495 B2 | 8/2015 | Gokhale |
| 9,239,687 B2 | 1/2016 | Vijayan et al. |
| 9,292,815 B2 | 3/2016 | Vibhor et al. |
| 9,633,033 B2 | 4/2017 | Vijayan et al. |
| 9,639,274 B2 | 5/2017 | Maranna et al. |
| 10,824,515 B2 | 11/2020 | Vibhor et al. |
| 11,030,059 B2 | 6/2021 | Vibhor et al. |
| 2003/0004770 A1 | 1/2003 | Miller et al. |
| 2004/0215656 A1 | 10/2004 | Dill et al. |
| 2005/0055328 A1 | 3/2005 | Yagawa |
| 2005/0071842 A1 | 3/2005 | Shastry |
| 2006/0080616 A1 | 4/2006 | Vogel et al. |
| 2006/0224432 A1 | 10/2006 | Li |
| 2006/0224846 A1 | 10/2006 | Amarendran et al. |
| 2007/0074155 A1 | 3/2007 | Ama et al. |
| 2007/0204275 A1 | 8/2007 | Alshab et al. |
| 2007/0250365 A1 * | 10/2007 | Chakrabarti ......... G06F 9/5072 705/7.26 |
| 2007/0283355 A1 | 12/2007 | Misono et al. |
| 2008/0209142 A1 | 8/2008 | Obernuefemann |
| 2009/0070121 A1 | 3/2009 | Leonelli et al. |
| 2009/0276449 A1 | 11/2009 | Syed et al. |
| 2009/0319534 A1 | 12/2009 | Gokhale |
| 2010/0250508 A1 | 9/2010 | Erofeev |
| 2010/0332456 A1 | 12/2010 | Prahlad et al. |
| 2011/0161297 A1 | 6/2011 | Parab |
| 2011/0238458 A1 * | 9/2011 | Purcell ............ G06F 9/5072 709/204 |
| 2012/0084269 A1 | 4/2012 | Vijayan et al. |
| 2012/0101999 A1 * | 4/2012 | Scherzinger ........ G06F 11/1466 707/654 |
| 2012/0102242 A1 | 4/2012 | Koren et al. |
| 2012/0150818 A1 | 6/2012 | Vijayan Retnamma et al. |
| 2012/0150826 A1 | 6/2012 | Vijayan Retnamma et al. |
| 2012/0151358 A1 | 6/2012 | Joanny et al. |
| 2012/0173340 A1 | 7/2012 | Zhao |
| 2012/0183340 A1 * | 7/2012 | Kanamoto ............ B41J 11/485 400/76 |
| 2012/0324387 A1 | 12/2012 | Rausch et al. |
| 2013/0036091 A1 | 2/2013 | Provenzano et al. |
| 2013/0111468 A1 | 5/2013 | Davis et al. |
| 2013/0151975 A1 | 6/2013 | Shadi et al. |
| 2013/0204948 A1 | 8/2013 | Zeyliger et al. |
| 2013/0253977 A1 | 9/2013 | Vibhor et al. |

(56) References Cited

U.S. PATENT DOCUMENTS

| | | |
|---|---|---|
| 2013/0254402 A1 | 9/2013 | Vibhor et al. |
| 2014/0146648 A1 | 5/2014 | Alber et al. |
| 2014/0149477 A1 | 5/2014 | Abramovitz et al. |
| 2014/0201170 A1 | 7/2014 | Vijayan et al. |
| 2014/0350997 A1 | 11/2014 | Holm et al. |
| 2016/0065419 A1 | 3/2016 | Szilagyi et al. |
| 2016/0232062 A1 | 8/2016 | Vibhor et al. |
| 2016/0350391 A1 | 12/2016 | Vijayan et al. |
| 2017/0115978 A1 | 4/2017 | Modi et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0025276 A1 | 1/2018 | Hill et al. |
| 2018/0143854 A1 | 5/2018 | Kumar et al. |
| 2018/0285204 A1 | 10/2018 | Dwarampudi et al. |
| 2019/0370122 A1 | 12/2019 | Vibhor et al. |
| 2021/0004299 A1 | 1/2021 | Vibhor et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Grasse et al., Base SAS vs. SAS Data Integration Studio—Understanding ETL and the SAS Tools Used to Support It, 2006 (accessed Jul. 13, 2015 at http://www.lexjansen.com/pharmasug/2006/DataManagementiDM02.pdf).

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

\* cited by examiner

AUTOMATION OF DATA STORAGE ACTIVITIES

CROSS-REFERENCE TO RELATED APPLICATION

This application is a continuation of U.S. application Ser. No. 17/023,833, filed Sep. 17, 2020, which is a continuation of U.S. application Ser. No. 16/438,332, filed Jun. 11, 2019, which is a continuation of U.S. application Ser. No. 15/017, 250, filed Feb. 5, 2016, which is a continuation of U.S. application Ser. No. 13/787,152, filed Mar. 6, 2013, which claims priority benefit to U.S. Provisional Application No. 61/615,037 filed Mar. 23, 2012, titled AUTOMATION OF DATA STORAGE ACTIVITIES, each of which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

In addition, as enterprises are storing and backing up ever increasing amounts of data, the ability to store and back up properly and quickly has become increasingly complex. The increased complexity for maintaining and restoring data has placed heavy demands on system administrators who are tasked with ensuring the data is stored and backed up efficiently and cost-effectively. System administrators may spend significant amounts of time monitoring the processes involved with different storage operations and ensuring they are completed successfully.

SUMMARY

A system is described that allows a user to design data storage system workflows by selecting on a user interface various data objects associated with data storage system related activities. The activities include computer-executable instructions and can be predefined or determined by the user. Once the workflow is created, the workflow is deployed to one or more workflow engines that can execute the various data storage activities related to the workflow. Prior to executing a data storage activity, the storage manager can determine which workflow engine to use based on an allocation scheme.

DETAILED DESCRIPTION

Figure 1A:
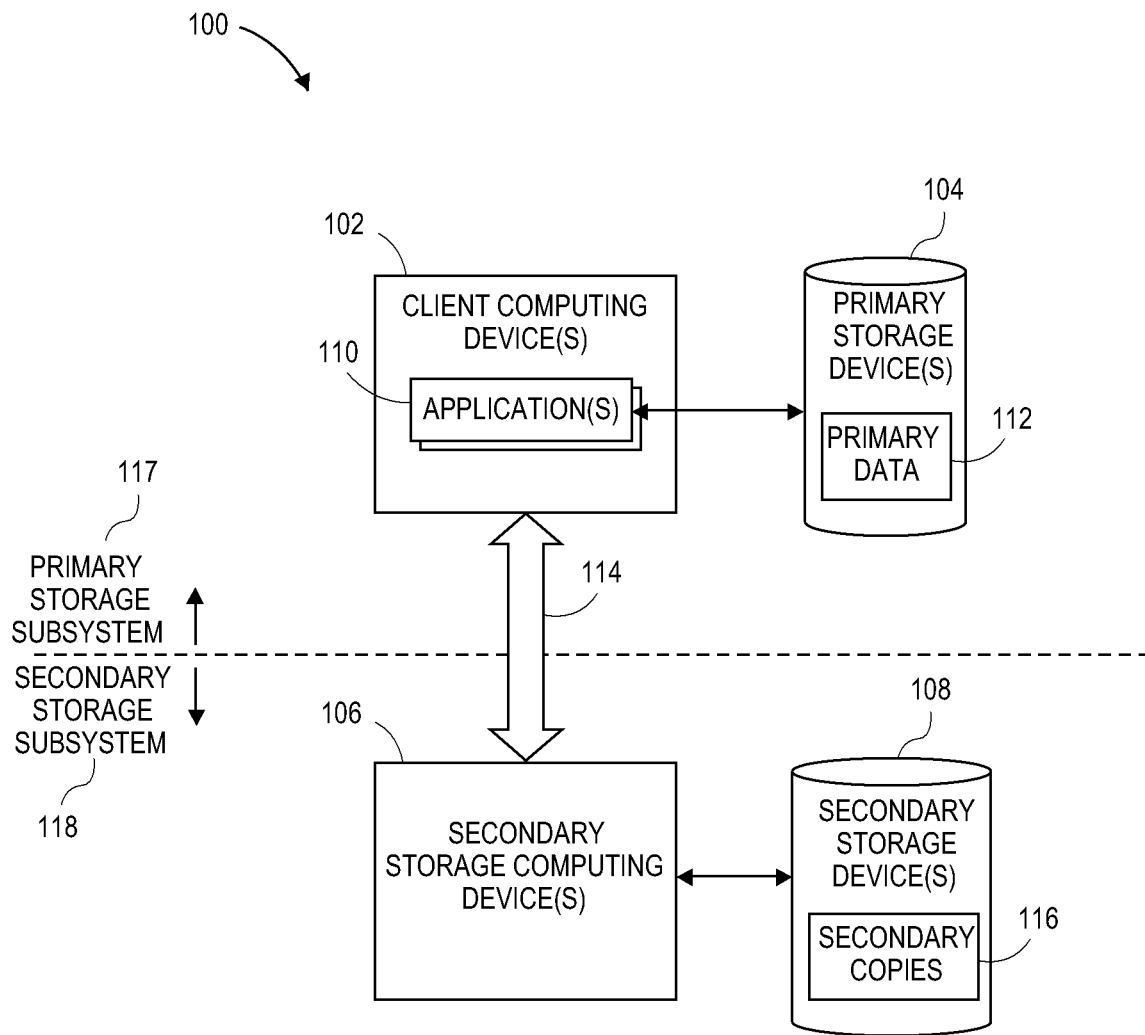
FIG. 1A is a block diagram illustrating an exemplary information management system.

Generally described, the present disclosure is directed to a system, method, and computer-readable storage medium for a storage management system. Specifically, embodiments described herein include systems and methods for generating and implementing an automated workflow for a networked storage system. For instance, a graphical user interface (e.g., a drag and drop interface) is provided allowing a user to intuitively design the desired workflow. The system can then generate and execute the automated workflow based on the user's input. Further embodiments provide intelligent allocation of workflow task execution. For instance, the system can distribute automation tasks to members of a workflow engine pool in order to balance resource usage, reduce automation time, or provide other advantages.

In general, the automated workflow manages a series of workflow activities, or tasks, to produce a final outcome or outcomes. The workflow may run over an extended period of time, for example, such as multiple hours, days, weeks, months, years, or longer. Furthermore, subsequent workflow activities of the workflow generally follow preceding workflow activities. Moreover, the automated activities may have dependencies. For instance, the activities can be dependent on the completion of one or more of the other data storage workflow activities, user input, or some other factor. As the various workflow activities are completed additional workflow activities are initiated or invoked. Once all the workflow activities are completed, the workflow can end.

As just one illustrative example, one or more client computers in a data storage system may generate production data associated with various user applications running on the clients. And a user may want to automate the scheduled creation of secondary copies of the production data. Embodiments described herein allow the user to create a data storage workflow to automate this process. For instance, the user can select for inclusion in the workflow a number of pre-configured or user-definable data storage activities. As just two examples, these activities may include (1) a data store backup activity which executes the actual creation of the secondary copy and (2) a backup monitoring activity which monitors the results (e.g., success or failure) of the secondary copy operation. The automated workflow may run generally continuously, automatically launching the data store backup activity at the scheduled backup times (e.g., at discrete times each week). Moreover, the automation system may also launch the backup monitoring activity, after completion of the data backup activity, or when otherwise appropriate.

According to certain aspects, the workflow management system includes a user interface that allows users to intuitively select and relate workflow activities together to define a workflow. In some embodiments, the workflow activities are data storage activities and the workflow is a data storage workflow. For example, users can drag-and-drop and then relate display objects that represent the various data storage workflow activities in the user interface. Based on the user input, the data storage workflow system generates a workflow for execution.

According to additional aspects, once the automated workflow is defined, the workflow is deployed to one or more workflow engines that can execute the workflow activities. When a workflow event occurs, the storage management system can select which computing device will execute the workflow activity based on a number of different criteria, such as measured activity levels of the workflow engines, for example.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
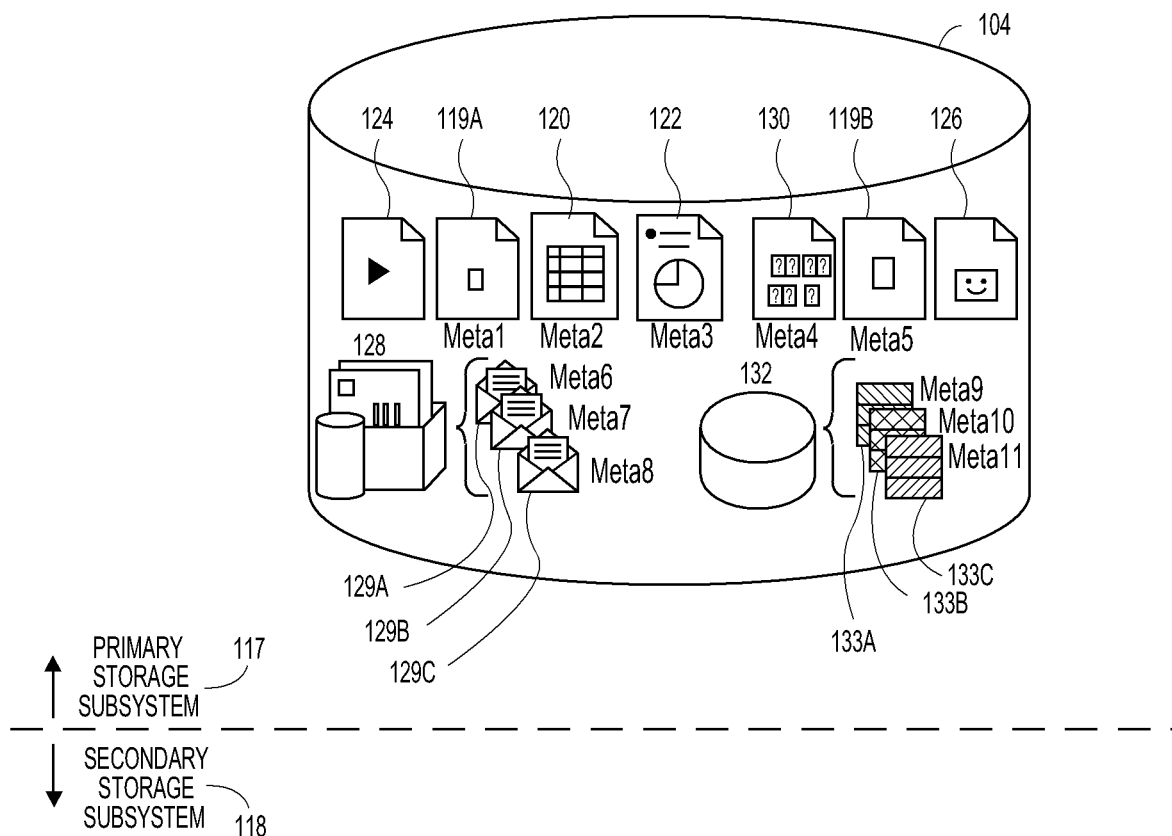
FIG. 1B is a detailed view of a primary storage device, a secondary storage device, and some examples of primary data and secondary copy data.
Figure 1B:
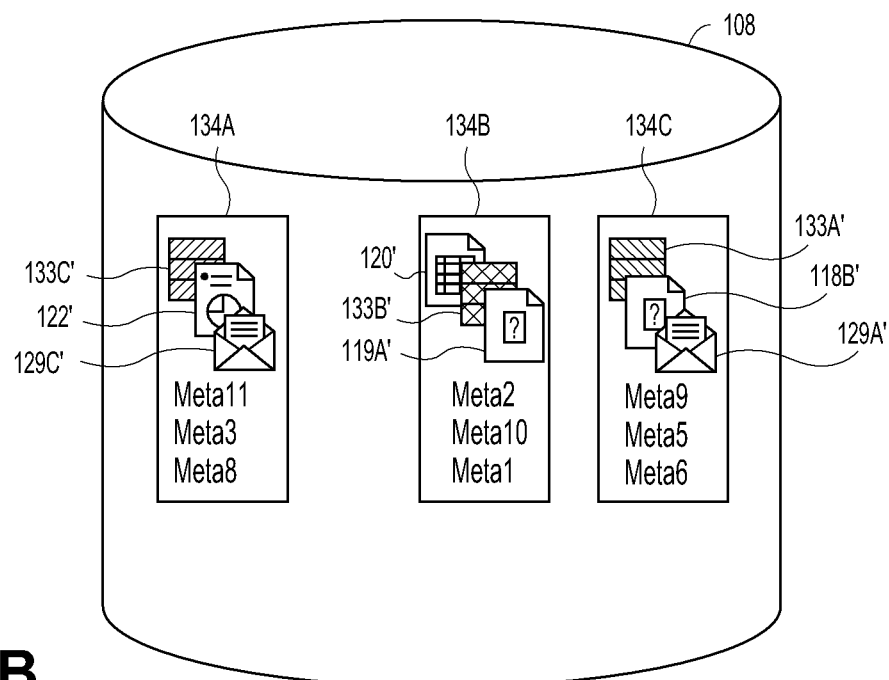

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
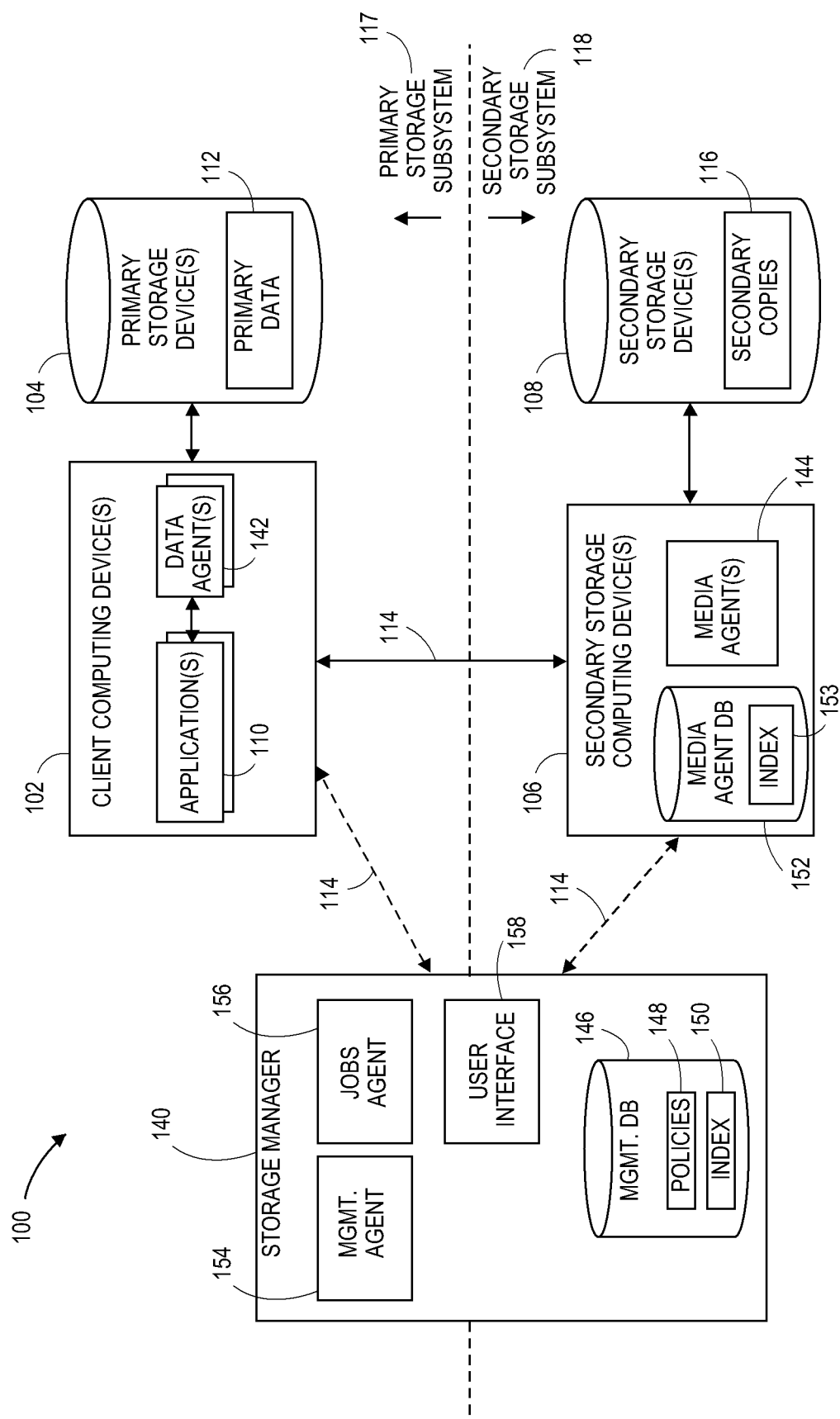
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
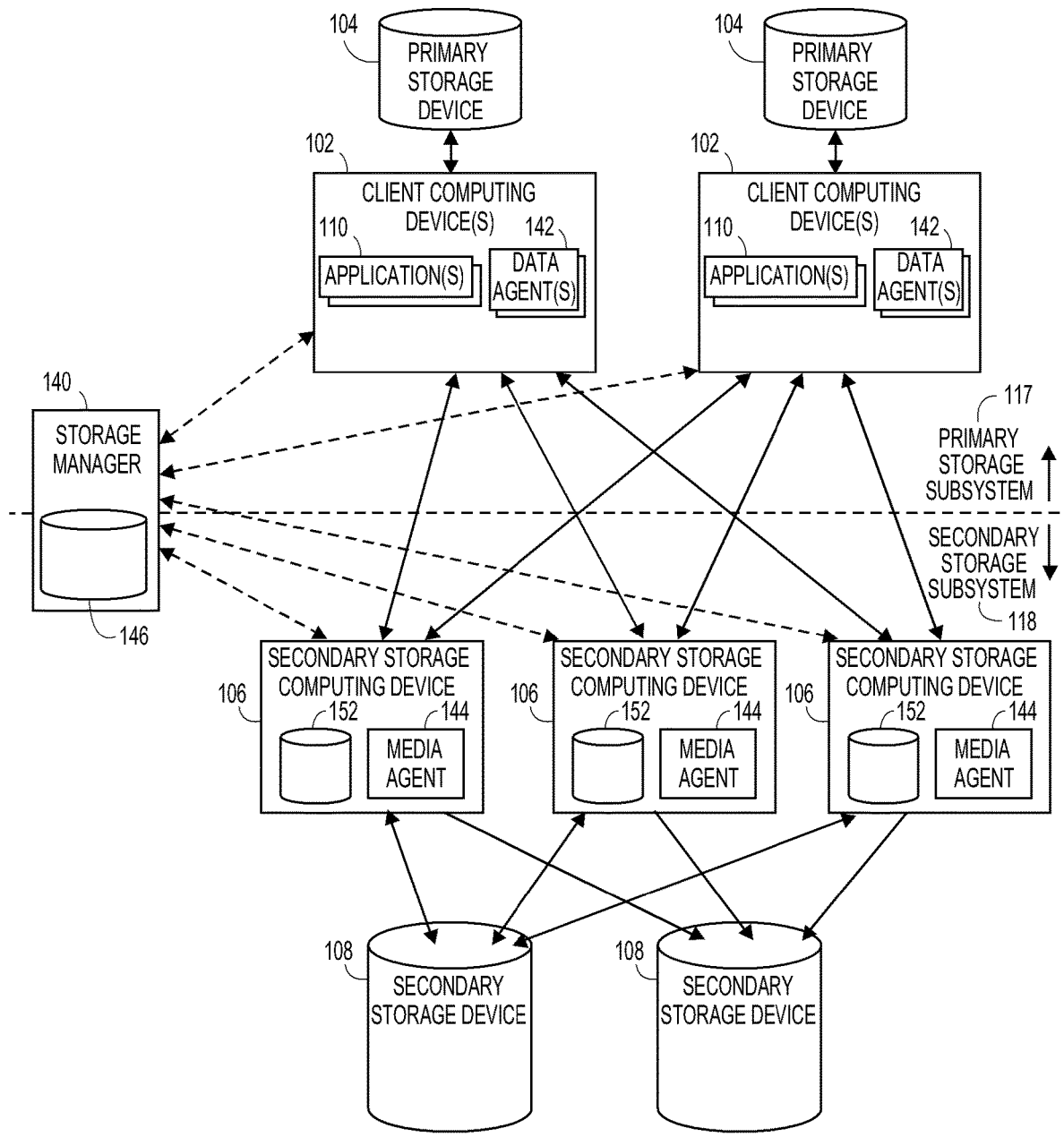
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having predefined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:
- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:
- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
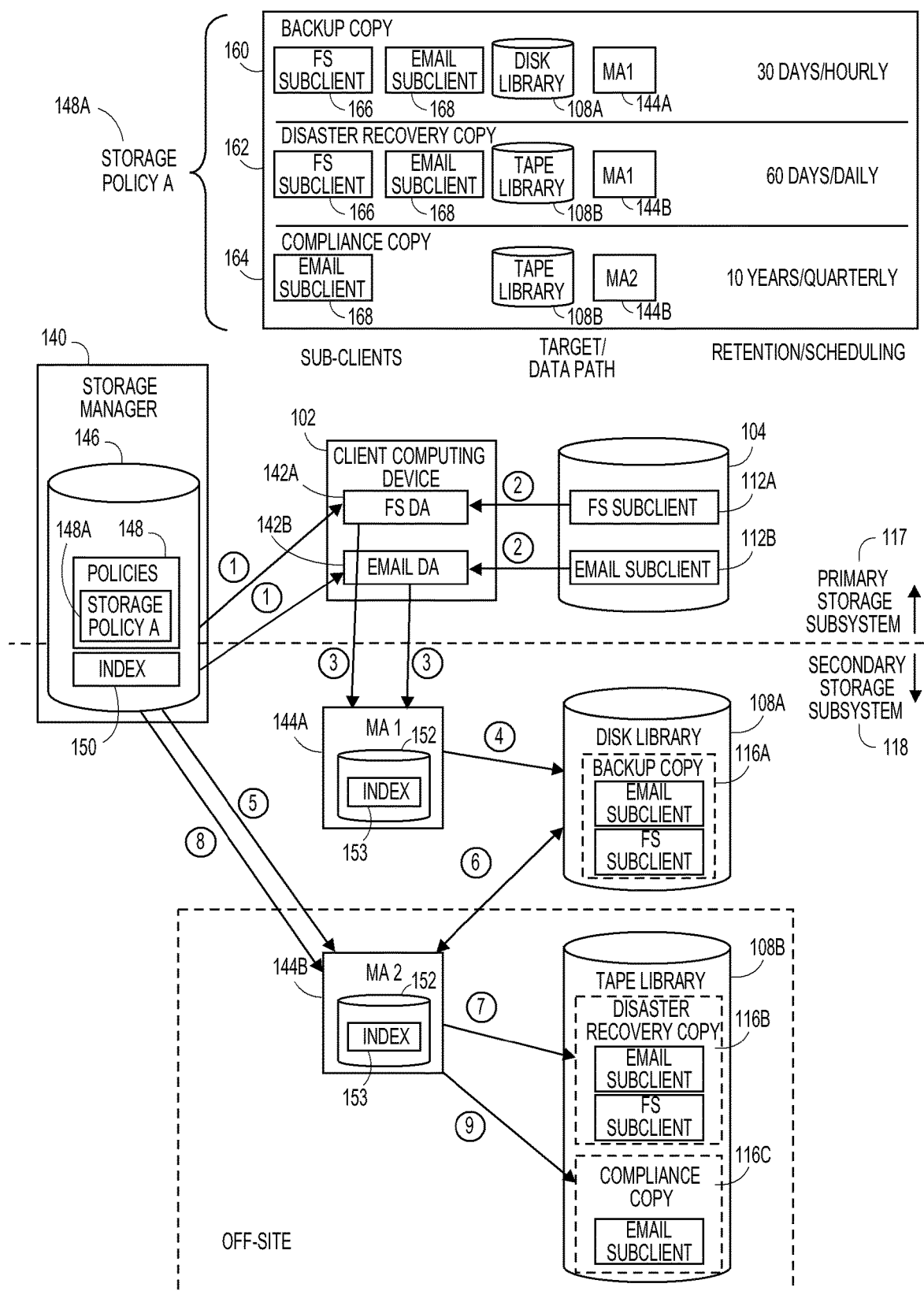
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Workflow Engines Overview

Figure 2:
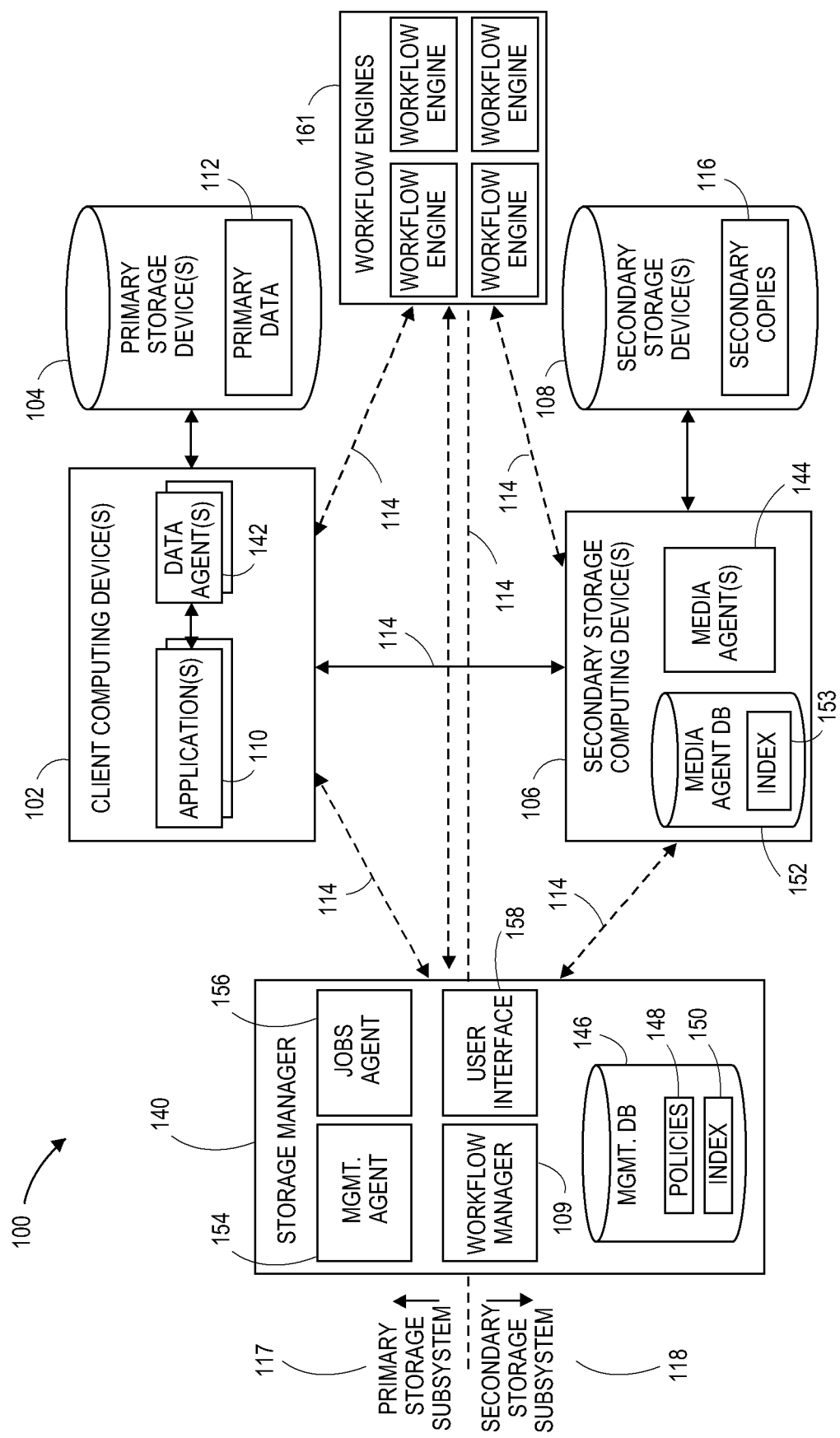
FIG. 2 shows a block diagram illustrative of an embodiment of a networked storage system.

FIG. 2 shows a block diagram illustrative of an embodiment of the networked storage system 100, described in greater detail above with reference to FIGS. 1A-1E. In the illustrated embodiment of FIG. 2, the storage system 100 further includes workflow engines 161, a workflow manager 109, and a user interface 111.

As illustrated, in certain embodiments, the storage manager 140 includes a workflow manager 109 as a separate component that is typically implemented as a software module or application program. In some embodiments, the workflow manager 109 executes on a computing device that is distinct from the computing device on which the storage manager executes. In some embodiments, the workflow manager 109 implements a workflow user interface 111 that enables a user to create, form, and/or modify workflows, workflow suites, and/or workflow activities, as will be described in greater detail below with reference to FIGS. 3A and 3B. The workflow manager 109 can also deploy workflows to the workflow engines 161, as will be described in greater detail below with reference to FIG. 5. As workflow activities are invoked, the workflow manager 109 can determine which workflow engine 161 is to perform the workflow activity based on an allocation scheme as will be described in greater detail below with reference to FIG. 5.

Generally speaking, the workflow engines 161 may be implemented as software modules that perform one or more data storage workflow activities as part of an overarching workflow, as will be described in greater detail below with reference to FIGS. 3A and 3B. The workflow engines 161 can be used to execute various workflow activities in order to automate workflows. As such, the demands on system administrators can be significantly reduced. The workflow engines 161 can be implemented on separate computing devices, or form part of the storage manager 140, clients 102, media agents 144, and the like. When implemented as separate computing devices, the workflow engines can be located remotely or in close proximity to the storage manager 140, clients 102, and/or media agents 144, and can communicate with the other components via the one or more communication pathways 114.

As will be described in greater detail below with reference to FIG. 5, once a workflow is defined by a user, the workflow manager 109 can deploy the workflow to one or more of the workflow engines 161. Once the workflow is deployed to one or more of the workflow engines 161, the storage system 100 can monitor incoming data to determine if a workflow event has occurred. For example, the storage system 100 can monitor incoming emails, status reports from the media agents 144 and storage devices 136, etc. Once a workflow event has occurred, the storage manager 140 can direct one or more of the workflow engines that include the deployed workflow to perform a predefined workflow activity. The storage manager 140 can determine which workflow engine to use based on an allocation scheme.

Workflow User Interface

Figure 3A:
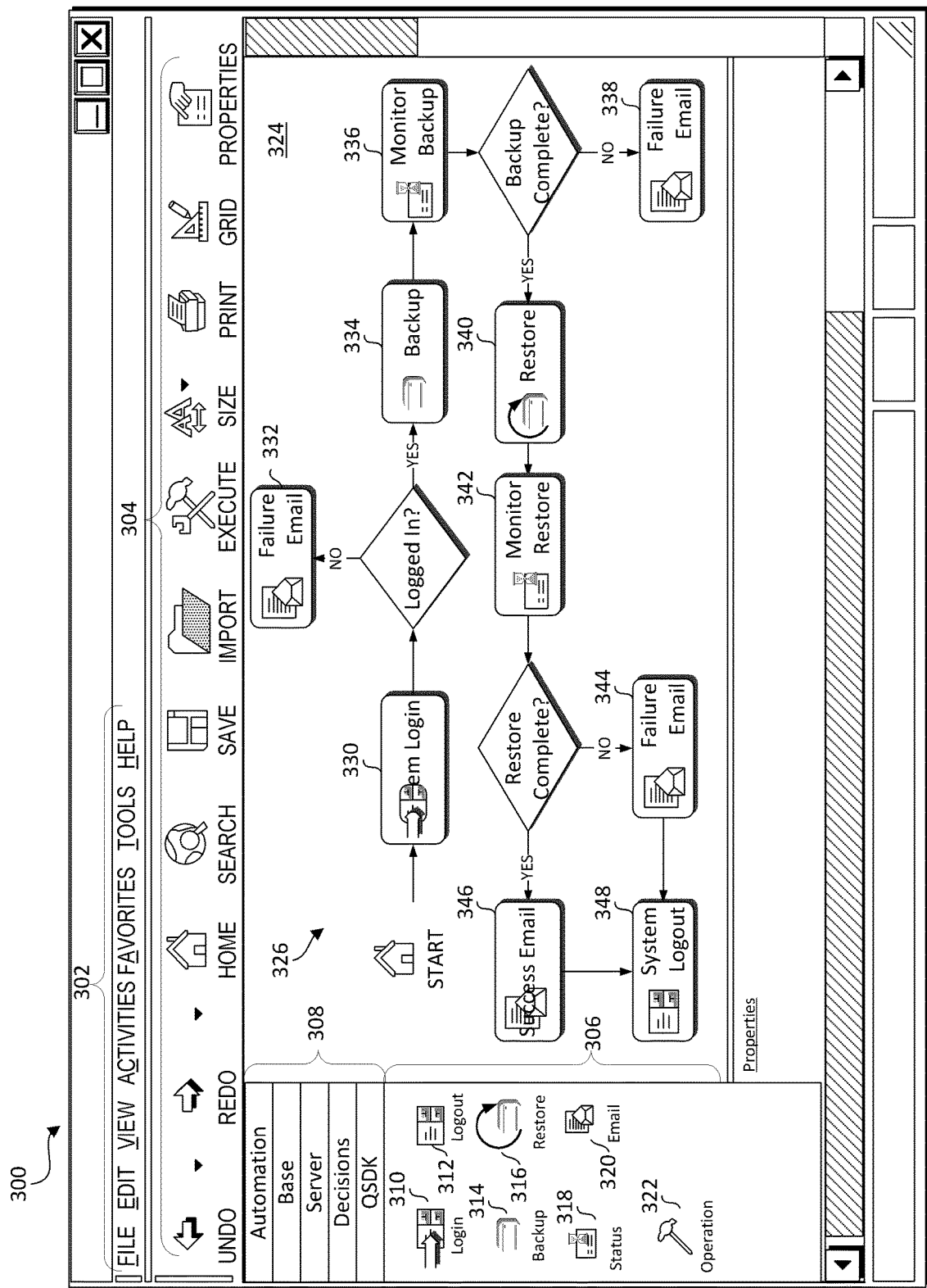
FIG. 3A depicts an illustrative user interface that enables a user to prepare a workflow for a networked storage system.

FIG. 3A depicts an illustrative user interface 300 that enables a user to create and/or modify a workflow for a networked storage system. The workflows can be used to automate one or more storage processes or procedures and can reduce the amount of time spent by a system administrator monitoring those processes. As illustrated, the user interface 300 includes various drop-down menus 302 and commands 304, as well as various display objects 306. Different display objects 306 can be viewed by selecting different groups 308, such as Automation, Base, Server, and Decisions. One skilled in the art will appreciate that the display objects 306 can be organized, grouped, and displayed in a variety of different ways. The user interface 300 may be the user interface 111 shown in FIG. 2, for example.

Each display object 306 can be associated with a different workflow activity that includes pre-configured, computer-executable instructions enabling a computing device to perform a specific operation or other task. In some embodiments, the specific operation or task relates to the use, configuration, administration, and/or maintenance of a networked storage system, such as the networked storage system 100. The display objects can be as numerous as the workflow activities, and can relate to a broad spectrum of types of activities, such as user access, data storage operations, communications, storage system configuration, billing, account administration, and the like. For example, user access display objects may include a login display object 310 and a logout display object 312, among others. The login display object 310 can be related to a login workflow activity that allows a user to access, or begin, the workflow. For instance, execution of the login activity may launch a log-in screen prompting a user to enter their log-in information. Similarly, the logout display object 312 can be related to a logout workflow activity that allows a user to log out of, or end, the workflow (e.g., by presenting a log-out interface on user interface).

Data storage operation display objects may include backup and restore display objects 314, 316, restore display object 316, and the like. The backup and restore display objects 314, 316 can be associated with similarly named workflow activities that perform a backup and restore operations. For example, the backup workflow activity 314 can be any type of secondary data copy, such as a snapshot copy, complete backup, archive copy, or the like. In some embodiments, each type of backup workflow activity (e.g. secondary data copy, snapshot copy, complete backup, archive copy, deduplication, etc.) can be associated with a distinct display object. Moreover, the backup activity can perform the secondary copy operation on a single data store or portions thereof, or multiple data stores or portions thereof, as defined by the workflow activity. The restore workflow activity 316 can be a restore of one or more data stores, or a restore of portions of one or more data stores, such as of one or more particular files, folders or data clusters.

The status display object 318 can be associated with a status workflow activity that determines the status of another workflow activity, such as a restore or backup. The status display object 318 can be associated with the data storage operation display objects or can form part of a general display objects category that can be used with various categories, or types, of display objects.

Communication display objects may include email display object 320, SMS display objects, fax display objects, computer-to-computer communication display objects or other display objects associated with communication workflow activities. For example, the email display object 320 can be associated with an email workflow activity that sends an email to a particular user based on different criteria. For example, if a backup or restore fails, an email can be generated as part of an email workflow activity and sent to a system administrator. Similarly, as part of one or more workflow activities, an email can be generated to alert a user if a bill is due or if a particular service is about to end.

Similarly, storage system configuration display objects can be associated with storage system configuration workflow activities, such as a security check workflow activity, media agent maintenance workflow activity, storage device expansion workflow activity, etc. For example, the security check workflow activity can review the data agents 142, media agents 144, clients 102, secondary storage devices 136, and the like for security potential security updates. In some embodiments, should any security updates be available, the security check workflow activity can update the component. In certain embodiments, a separate workflow activity can update the component. Other storage system configuration workflow activities can include software installation workflow activities to install software to the various components of the networked storage system 100, storage device installation workflow activities to configure and install a new secondary storage device 136 as part of the system 100. For instance, in one embodiment, one or more activities of the workflow suite are configured to (1) discover or otherwise identify the clients in the system 100, (2) determine whether the individual clients have certain security software installed (e.g., anti-virus software) and (3) for the clients not having the security information installed, cause the security software to be downloaded; and/or (4) cause the security information to be installed.

Billing and account administration display objects can be associated with similarly named workflow activities. For example, billing workflow activities can review billing information and monitor whether invoices for a particular account are up-to-date or past due. Account administration workflow activities can track and modify account information, such as whether an account is active or suspended. The account administration workflow activities can also be used to create, modify, or remove accounts and account information as desired.

Other display objects 322 can be associated with user-defined workflow activities that perform actions as defined by the user. The illustrated examples are not limiting. Rather, a large number of possible workflow activities and corresponding display objects can be provided as part of the user interface 300, such as performing a storage policy lookup, retrieving client, media agent information, etc., and the like. For example, a storage policy lookup workflow activity can query the storage manager or other device to determine the storage policy for the system. Other workflow activities can be used to modify the retrieved storage policy. Similarly a workflow activity can retrieve client 102, data agent 142, media agent 144, and/or secondary storage device 136 information from the desired system component. Other workflow activities can modify the properties or parameters of the selected system component as desired. Furthermore, a user can interact with the workflow manager 109 (e.g., the user interface 300) to create their own display objects and associated workflow activities, or to group multiple workflow activities together to form a larger workflow activity.

To create a workflow, a user can select one or more display objects 306 and relocate the display objects 306 to a workflow modify area 324 of the user interface 300. In some embodiments, the user can "drag and drop" the display objects 306 onto the workflow modify area 324. The user can also organize and relate the display object 306 as desired to define a workflow for the storage system 100. For example, the user can move the display objects around the workflow modify area 324 and then connect the display object 306 with connectors. Similarly, a user can modify an existing workflow by adding, moving or removing one or more workflow activities from the workflow.

Workflow Example

In the illustrated embodiment of FIG. 3A, the user interface displays a backup/restore workflow 326. The backup/restore workflow 326 includes multiple display objects that are associated with workflow activities. Due to the association between display objects and workflow activities, the components of the workflow 326 are referred to as display objects and workflow activities interchangeably. For example, the display object 330, which is associated with a login workflow activity is also referred to as the login workflow activity 330. The example workflow 326 is an example, and is not to be construed as limiting. As will be described in greater detail below with reference to FIG. 5, one or more workflow engines 161 can be used to carry the constituent workflow activities of the workflow 326. Furthermore, each time a workflow activity or group of workflow activities of the workflow 326 are invoked for execution, the system can determine which workflow engine 161 to use to carry out the current workflow activity or group of workflow activities. To determine which workflow engine 161 to use, the system can use an allocation scheme and/or other information regarding the workflow engines 161.

Once the workflow 326 is initiated, the workflow manager 109 determines which workflow engine 161 will execute the next workflow activity, as will be described in greater detail below with reference to FIG. 5. In some embodiments, prior to each workflow activity being executed, the workflow manager 109 identifies a workflow engine 161 to perform the current workflow activity. In certain embodiments, the workflow engine that performs the current workflow activity is predetermined. The first workflow activity of the workflow 326 includes a login workflow activity 330 that allows a user to log into, or begin, the workflow 326. In some embodiments, as part of the login workflow activity 330, the system determines whether the login has occurred or was successful. The determination can be made by the workflow manager 109, workflow engine 161, or other system component. For example, the login workflow activity 330 can include a timeout threshold or a failed login attempts threshold that when reached can result in the login being unsuccessful. In certain embodiments, the determination of success, failure, completion and/or other status of a current workflow activity is itself a distinct workflow activity. And, depending on the determination, different subsequent workflow activities can be invoked. For instance, if the login is unsuccessful an email workflow activity 332 shown as a failure email is invoked. As determined by the email workflow activity 332, an email is generated and sent by the system. The failure email workflow activity 332 can define when the email is to be sent, to whom the email is sent, and the contents of the email.

On the other hand, if the login workflow activity 330 is completed successfully, a backup workflow activity 334 is invoked and a backup of the data storage devices referred to by the backup workflow activity 334 begins. As mentioned previously, prior to performing the backup workflow activity 334, the workflow manager 109 can identify a workflow engine to perform the backup workflow activity 334. The determination can be made based on an allocation scheme, as will be discussed in greater detail below. As part of the backup workflow activity 334 and with reference to FIG. 2, the workflow engine 161 can instruct the storage manager 140 or the media agent 144 to initiate and manage a secondary copy of production data generated by one or more clients 102 to one or more secondary storage devices 136. In some embodiments, a separate monitor backup workflow activity 336 is also invoked. In certain embodiments, the monitor backup workflow activity 336 forms part of the backup workflow activity 334. The monitor backup workflow activity 336 monitors the backup to determine if there are any errors and whether the backup is complete. The monitor backup workflow activity 336 can use a predetermined time to determine when the backup workflow activity 334 should be completed. If any errors occur or if the backup workflow activity 334 is not completed according to the monitor backup workflow activity 336, the failure email workflow activity 338 is invoked and a failure email is sent as determined by the failure email workflow activity 338.

On the hand, if the backup completes, the restore workflow activity 340 and the monitor restore workflow activity 342 are invoked, similar to the backup workflow activity 334 and the monitor backup workflow activity 336, described above. The restore workflow activity 340 can be used to restore one or more of the secondary storage devices 136, or portions thereof, to one or more clients 102, and the monitor restore workflow activity 342 can be used to monitor the restore workflow activity 340. If the restore is unsuccessful, failure email workflow activity 344 is invoked similar to the failure email workflow activity 338. Following the failure email workflow activity 344, the system logout workflow activity 348 is invoked to allow the user to logout of, or end, the backup/restore workflow 326. However, if the restore workflow activity 340 is completed, the email workflow activity is 346 is invoked and a success email is generated and sent as determined by the email workflow activity is 346. Following the email workflow activity 346, the system logout workflow activity 348 is invoked, and the workflow 326 is ended. Depending on the embodiment, the workflow 326 can be altered and modified in a variety of ways, and different workflows can be created using different workflow activities as desired.

Figure 3B:
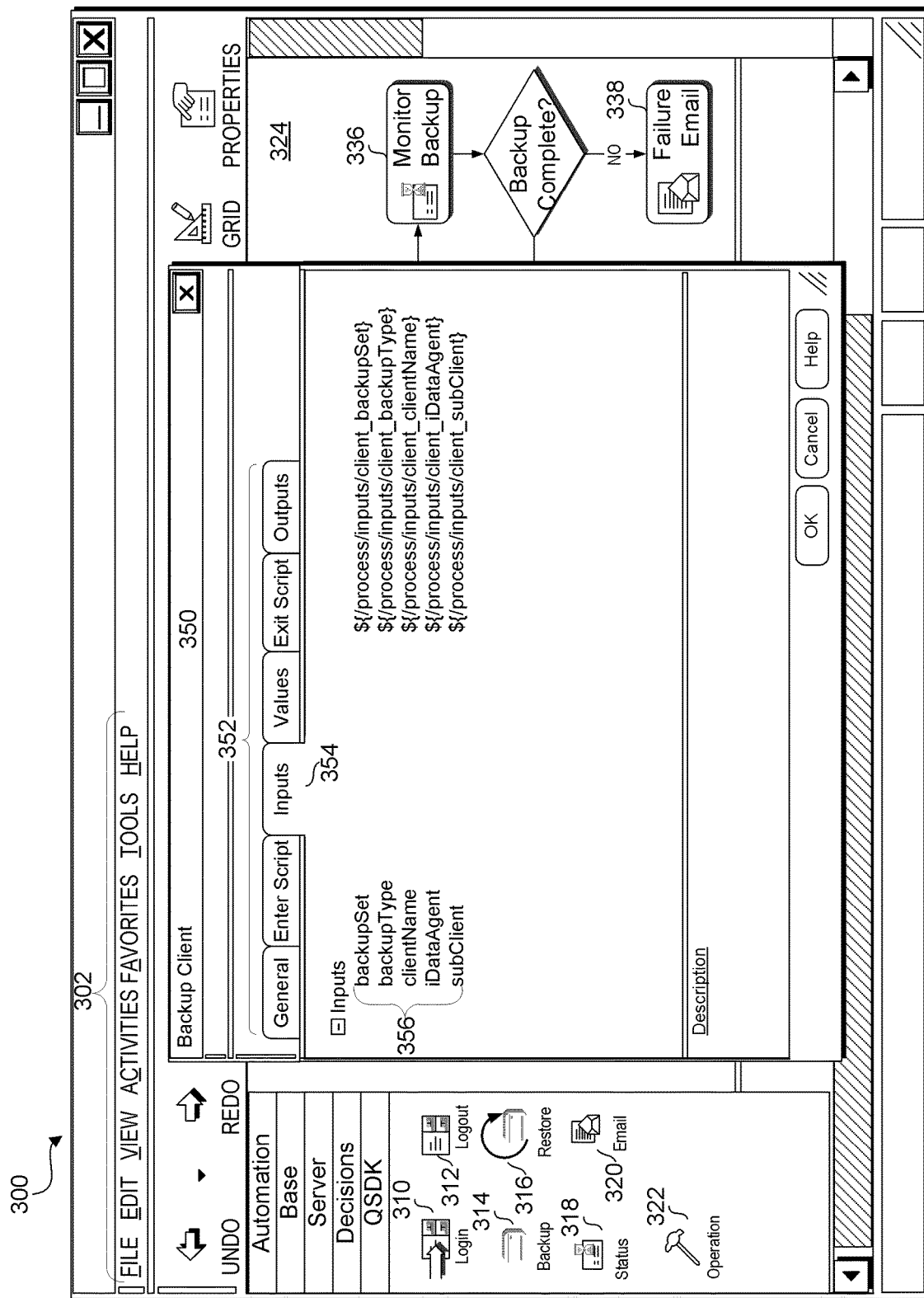
FIG. 3B depicts an illustrative user interface that enables a user to view the properties of a workflow activity.

FIG. 3B depicts the user interface 300 and a display window 350 displaying the properties of a workflow activity. In the illustrated embodiment, the display window 350 enables a user to view the properties of the backup workflow activity 314. Various tabs 352 of the display window 350 relate to various properties of the backup workflow activity 314.

In the illustrated embodiment, the inputs tab 354 is displayed along with various inputs 356 of the backup workflow activity 314. The various inputs 356 are used by the backup workflow activity 314 to determine parameters of the backup or other secondary copy operation. For example, the inputs can be used to determine the type of backup, such as a snapshot or full backup. The input parameters can also determine which client, clients, or portions thereof are to be backed up. Additionally, the inputs can include which data agents will be used during the backup and any subclients within the clients that will be backed up. Other input parameters can be used, such as the frequency of the backup, a termination time of the backup or a time by when the backup needs to be completed, certain criteria to determine which workflow engine 161 should be used to handle the backup, etc. In some embodiments, a user is able to edit the properties of the backup workflow activity 314, such as the inputs, as desired.

The display window 350 can similarly be used to view other properties of the backup workflow activity 314. For example, the display window 350 can be used to display general information related to the backup workflow activity 314, enter scripts, values, exit scripts and outputs of the backup workflow activity 314.

Workflow Creation and Modification

Figure 4:
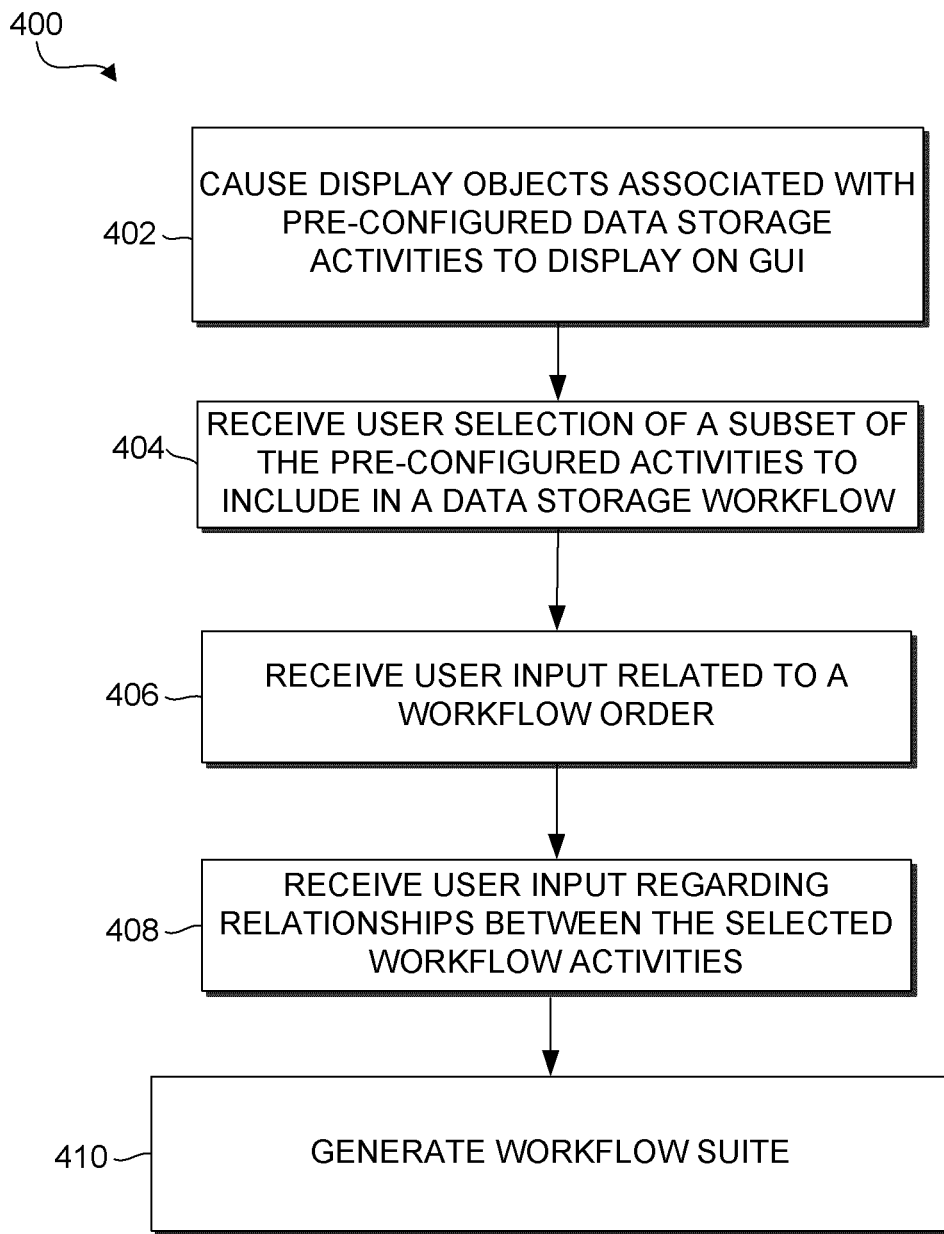
FIG. 4 shows a flow diagram illustrative of embodiments of a routine for generating workflow suite.

FIG. 4 shows a flow diagram illustrative of embodiments of a routine 400 implemented by a storage manager 140 for modifying a workflow. The elements outlined for routine 400 may be implemented by one or more computing devices/components that are associated with the storage system 100. For example, routine 400 can be implemented by any one, or a combination of the storage manager 140, the workflow manager 109, the client 102, the media agent 144, the workflow engines 161, and the like. Accordingly, routine 400 has been logically associated as being generally performed by the storage manager 140, and thus the following illustrative embodiment should not construed as limiting.

At block 402, the storage manager 140 transmits data to cause display objects associated with the workflow activities to be displayed on a display device associated with a user, similar to the display objects 306 discussed previously with respect to FIGS. 3A and 3B. As mentioned previously, the workflow activities include computer-executable instructions that enable a workflow engine 161 to perform a predefined operation or task. The display device can be associated with a client computing device 102, a system administrator computing device, or other display device.

At block 404, the storage manager 140 receives indications to group a subset of the display objects. For example, when a user places one or more display objects 306 within the workflow modify area 324, the storage manager 140 can receive indications that the one or more display objects within the workflow modify area 324 form a group. The grouped display objects 306 can be used to form a workflow, similar to the workflow 326.

At block 406, the storage manager receives indications to order the subset of the display objects. As a user arranges the one or more display objects 306 within the workflow modify area 324, the storage manager 140 can receive indications regarding the order of the display objects. The order can relate to the location of the display objects from left-to-right, top-to-bottom, front-to-back, spiral, shapes, colors, a spatial location within the workflow modify area 324, such as distance from center, side, top, or bottom, etc.

At block 408, the storage manager receives indications to relate the subset of display objects. As a user relates display objects 306, the storage manager 140 can receive indications regarding the created relationships. The user can use relationship indicators to denote a relationship between display objects. The relationship indicators can be implemented using arrows, pointers, colors, numbers, letters, symbols, combinations thereof, and the like. In addition, the relationship indicators can create various types of relationships including, but not limited to, sequential relationships, parallel relationship, conditional relationships, and the like. For example, an arrow from one display object to another, such as the arrow from the backup 334 to the monitor backup 336 can indicate that the backup workflow activity 334 is to begin prior to the monitor backup workflow activity 336. Similarly, a "yes" arrow can indicate a conditional relationship between two or more display objects.

At block 410, the storage manager generates a workflow suite based on the group, order and/or relationship between the subset of display objects, and the workflow activities associated with the subset of the display objects. The workflow suite can include the parameters, properties, and other information regarding the individual workflow activities and the workflow as a whole. For example, the workflow suite can include the order in which workflow activities occur within the workflow, the relationship between different workflow activities, dependencies associated with the workflow activities, the inputs and outputs of the different workflow activities, etc. In some embodiments the storage manager can review the display objects to ensure the order, relationship, and/or group are consistent and/or would not cause an error. For example, the storage manager 140 can review the input and output properties of each workflow activity and check that the outputs of earlier workflow activities match the inputs of subsequent workflow activities.

Additional, fewer, or different blocks can be used to implement the routine 400 without departing from the spirit and scope of the description. For example, the storage manager 140, can receive indications to order the display objects before, after, or at the same time as receiving indications to relate the display objects. In some embodiments, the storage manager 140 receives the indications regarding groups, order, and relationships at the same time that it generates the workflow suite. In certain embodiments, the storage manager 140 receives indications to include a subset of the display objects in the workflow in response to a user's interaction with the graphical user interface 300. Once the indication is received, the storage manager 140 generates a workflow suite that includes the subset of workflow activities that correspond to the display objects included in the subset. As mentioned above, the order and relationship between the workflow activities can be based on user input via the user interface 300. In certain embodiments, the storage manager can receive indications to alter properties of a particular display object. The properties may include, but are not limited to, inputs, outputs, computer-executable instructions, dependencies on other display objects, etc.

Workflow Operation

Figure 5:
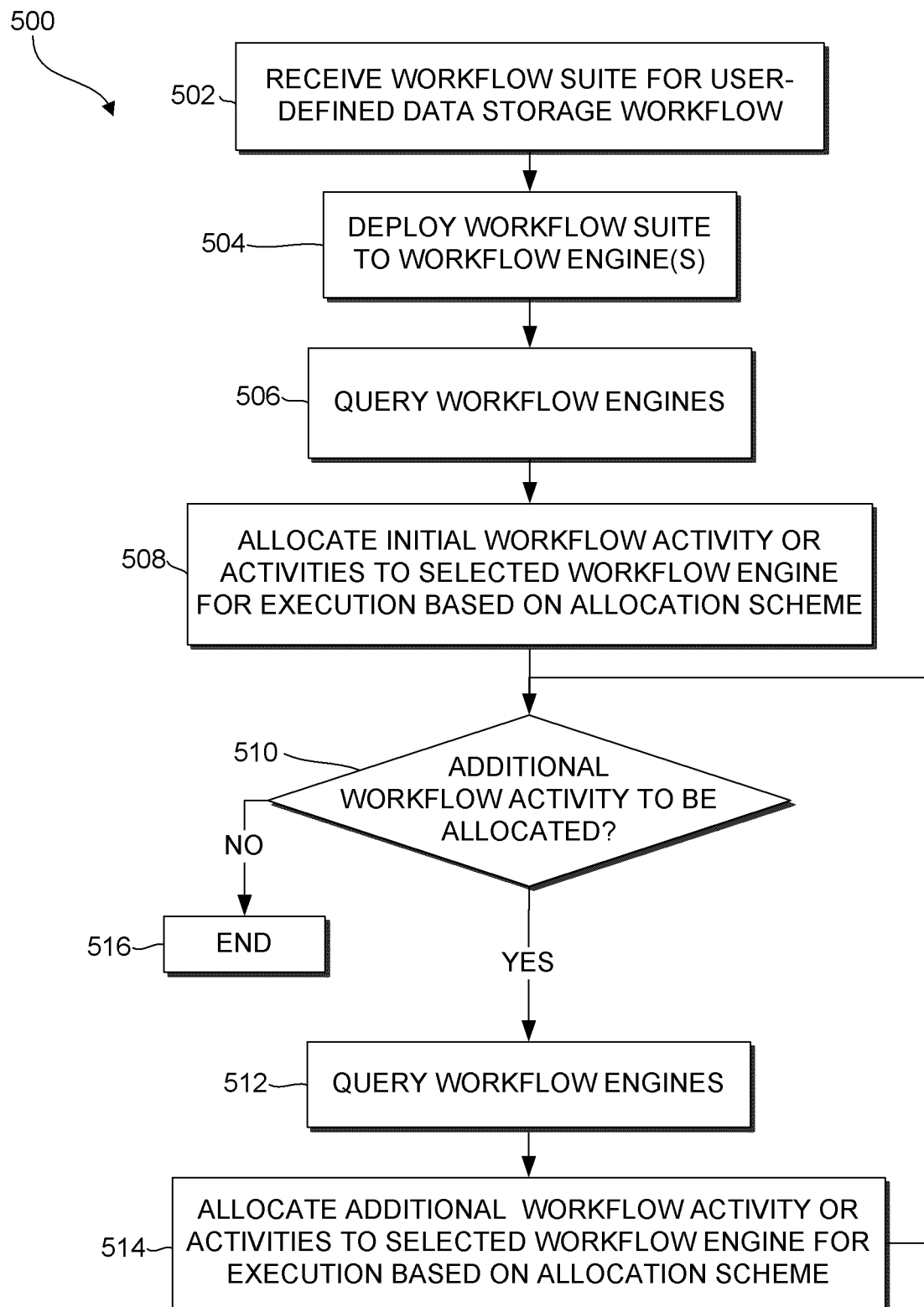
FIG. 5 shows a flow diagram illustrative of embodiments of a routine for allocating workflow assignments between workflow engines.

FIG. 5 shows a flow diagram illustrative of embodiments of a routine 500 implemented by a storage manager 140 for allocating workflow assignments between workflow engines 161. The flow diagram is not limiting, and the elements outlined for routine 500 may be implemented by one or more computing devices/components that are associated with the storage system 100. For example, routine 500 can be implemented by any one, or a combination of the storage manager 140, the workflow manager 109, the client 102, the media agent 144, the workflow engines 161, and the like. Accordingly, routine 500 has been logically associated as being generally performed by the storage manager 140, and thus the following illustrative embodiment should not construed as limiting.

At block 502, the storage manager 140 receives the workflow suite associated with a particular workflow from the workflow manager 109 As mentioned previously, the workflow suite can include the parameters and information regarding a specific workflow. For example, the workflow suite can include the order in which workflow activities occur within the workflow, the relationship between different workflow activities, dependencies associated with the workflow activities, the inputs and outputs of the different workflow activities, and the like. As described in greater detail above with reference to FIGS. 3A and 3B, the workflow and many of the workflow parameters can be defined using the user interface 300. In some embodiments the user interface 300, display objects 306, workflows, and workflow activities, are implemented using an object-oriented computer language, such as Java, C++, C#, etc. The storage manager 140 can receive the workflow suite via a LAN, such as an organization's internal network, or a WAN (e.g., the Internet).

At block 504, the storage manager 140 deploys the workflow suite to one or more workflow engines 161. In some embodiments, the storage manager 140 can use the workflow manager 109 to deploy the workflow suite to the workflow engines 161. In some embodiments, as part of the deployment, the storage manager 140 additionally transmits the routines, processes, executable instructions, and other information sufficient to execute the individual workflow activities to the workflow engines 161. In certain embodiments, the storage manager 140 can transmit the parameters of the workflow suite that allow the workflow engines 161 to determine which workflow activities already stored on the workflow engines 161 are to be executed, and in what order. For example, the storage manager 140 can transmit workflow activity identifiers, pointers, function calls, a combination thereof, and other appropriate information that allows the workflow engines 161 to identify the workflow activities to execute and which order to execute them in.

The storage manager 140 can deploy the workflow suite to one or more workflow engines 161 based on the workflow engines 161 selected via the user interface 300 or based on a deployment scheme The deployment scheme can be selected based on specific system design preferences, user preferences, and can take into account a variety of factors. In some embodiments, the allocation scheme can be based on activity levels of the workflow engines 161. For example, the storage manager 140 can deploy the workflow suite to workflow engines 161 with low or medium activity levels prior to deploying workflow suite to workflow engines 161 with high activity levels. A wide variety or combination of metrics can be used to determine the activity levels of the workflow engines 161, and what constitutes "low," "medium," and "high" activity levels can be determined by a user, as desired.

In some embodiments, the activity level can be based on the total number of workflows (or total number of workflow suite) that have been deployed to individual workflow engines 161. For example, workflow engines having at or above a threshold number of deployed workflows (or threshold number of workflow suite) can be identified as having a high activity level, while workflow engines with fewer than a threshold number of workflows (or number of workflow suite) can be identified as having a low activity level. In some embodiments, workflow engines with workflow suite between two thresholds can be identified as having a medium activity level.

In certain embodiments, the activity level can be based on the number of computer processes or active computer processes on a workflow engine. The number of active processes can relate to the number of workflow activities currently being performed by the workflow engine 161. Similar to the number of workflow suite, various thresholds can be set as desired to determine the number of processes or active processes that constitutes "low," "medium," and "high" activity levels.

In some embodiments, the activity level can be based on a utilization rate of a workflow engine 161. The utilization rate can be based on the amount, size and/or speed of the resources available to the workflow engine (e.g., processing speed, number of processors or processor cores, memory size and speed, communication rates, etc.) compared with how close to capacity the resources are operated. For example, a processor of a workflow engine may be relatively slow, but on average only be operating at 30% of its capacity, and therefore may have a low utilization rate and low activity level. In contrast, a relatively fast processor with multiple cores may operate at 95% capacity on average and therefore have a high utilization rate or high activity level. Additional metrics, or combinations thereof, can be used to determine the activity level of a workflow engine.

In some embodiments, the deployment scheme can be based on resources (speed, size, memory, processor) of the workflow engines. In certain embodiments, the storage manager 140 may access a stored table or index including a listing of the workflow engines 161 and associated parameters (e.g., associated computing resources). As mentioned above, the resources can relate to the processing speed, number or processors or cores, memory size and speed, and/or communication rates of a particular workflow engine. For example, the deployment scheme may have minimum resource requirements, such as minimum processing speed, memory size, etc. Other deployment schemes may prefer older, smaller, or slower resources.

In certain embodiments, the deployment scheme is based on physical proximity to the workflow engines 161. For example, the deployment scheme may have preference for workflow engines 161 that are physically closer to the storage manager 140 or a particular client 102, media agent 144, and/or secondary storage device 136. Similarly, the deployment scheme can be based on the speeds of communication pathways between the workflow engines 161 and other components of the system 100. For example, the workflow may be time sensitive and the deployment scheme may have a preference for faster communication pathways. In certain embodiments, the workflow may be of low priority and the deployment scheme may have a preference for slower communication pathways to reserve the faster communication pathways for more important workflows.

In some embodiments, the deployment scheme can be based on failure rates of the workflow engines 161. For example, the deployment scheme may have a preference for workflow engines 161 with failure rates below a threshold. Different workflows may have different failure rate thresholds depending on their priority and/or sensitivity levels. In certain embodiments, the deployment scheme can also take into account scheduled maintenance or down time. For example, some workflows may have specific time constraints, such as being completed on a weekend. The deployment scheme can take into account the scheduled maintenance or down time of workflow engines 161 to avoid deploying workflow suite to workflow engines 161 that will be unavailable when workflow activities will be performed. The deployment scheme can also take into account software versions or updates. For example, workflow engines 161 with a certain software version number may be preferred over others, or the deployment scheme may prefer prior that all workflow engines 161 that will receive the workflow suite have the same software version number. In some embodiments, the deployment scheme can use probabilistic determinations to identify the workflow engines 161 that will likely have sufficient bandwidth to handle future workflow activities associated with the workflow. In certain embodiments, the deployment scheme deploys the workflow suite to workflow engines 161 based on the costs of operating or licensing the workflow engine.

In some embodiments, different workflow engines 161 are configured to handle specific workflow activities, and the storage manager 140 deploys portions of the workflow suite to the different workflow engines based on their configuration. For example one workflow engine may be specifically configured to handle backup workflow activities, while another workflow engine may be specifically configured to handle storage policy requests. Based on these configurations, the storage manager 140 can deploy the portions of the workflow suite that relate to backup storage operations to the first workflow engine and deploy the portions of the workflow suite that relate to storage policy requests to the second workflow engine.

With continued reference to FIG. 5, at block 506, the storage manager 140 queries the workflow engines 161. As part of the query the storage manager can obtain information related to the workflow engines that can be used to allocate the initial workflow activity. The information queried from the workflow engines 161 can be based on an allocation scheme of the system 100, the storage manager 140, or the workflow itself, as will be described in greater detail below At block 508, the storage manager 140 allocates the initial workflow activity based on the allocation scheme. The allocation scheme can be similar in many respects to the deployment scheme described above, and can be used to determine which of the workflow engines 161 is to perform the initial workflow activity. Similar to the deployment scheme, the allocation scheme can be based on different factors, such as activity levels, workflow engine resources, physical proximity, communication pathway speeds, failure rates, schedule maintenance or down time, software versions, costs of operation, etc. In some embodiments, the allocation scheme takes into account a probabilistic determination that the initial workflow activity will be completed within a predetermined time frame. In some embodiments, the allocation scheme allows the storage manager 140 to divide the initial workflow activity between workflow engines. In this way, the initial workflow activity can be completed more quickly. In some embodiments, the allocation scheme directs the selection storage manager 140 to select one or more workflow engines 161 from among the workflow engines 161 to which the workflow suite has been deployed. In certain embodiments, the storage manager 140 selects a different workflow engine to which the workflow suite has not already been deployed.

The allocation scheme can direct the storage manager 140 to dynamically select a workflow engine 161 for the initial workflow activity and for each subsequent workflow activity. Thus, in some embodiments, prior to each workflow activity, the storage manager 140 determines which workflow engine is to perform the current workflow activity.

In certain embodiments, as part of the allocation scheme, the storage manager can select one or more workflow engines to perform multiple workflow activities consecutively, or divide a group of workflow activities between multiple workflow engines 161. As such, the storage manager 140 can reduce the frequency of allocating workflow activities to one or more workflow engines 161. In some embodiments, the storage manager 140 can select one or more workflow engines 161 to perform the entire workflow. Thus, each time a workflow event occurs, the preselected workflow engines 161 are used to perform the current workflow activity. In such embodiments, the assigned workflow engines 161 can determine when a workflow activity is to be performed and which workflow engine 161 will perform the workflow activity.

In certain embodiments, the allocation scheme directs the storage manager 140 to determine whether a workflow engine that does not include the deployed workflow suite is better suited for the initial workflow activity. If the workflow engine that does not include the deployed configuration parameters is better equipped to perform the initial workflow activity, the storage manager 140 assigns the initial workflow activity to the different workflow engine. For example, the storage manager 140 may determine that the workflow engines including the deployed workflow suite are over utilized or lack sufficient bandwidth to complete the initial workflow activity within a given time. Alternatively, the storage manager 140 may determine that the different workflow engine is under-utilized or includes resources that are better equipped to handle the initial workflow activity. Accordingly, the storage manager 140 can deploy the entire workflow or portions thereof to the workflow engine that does not include the deployed workflow suite and have that workflow engine execute the initial workflow activity.

Once the initial workflow activity is allocated, the storage manager 140 determines whether another workflow activity from the workflow is to be allocated, as illustrated at block 510.

In some embodiments, to determine whether a workflow activity should be allocated, the storage manager 140 can monitor the workflow engine 161 that is performing the initial workflow activity, other workflow engines 161, and/or additional data, such as internal or external communications, user input that relates to the workflow, requests to access the workflow, or other data. In certain embodiments, the storage manager 140 can determine that a workflow activity is to be allocated based on an incoming email with predefined information. For example, an email from a customer may include payment information or a request not to end services. In certain embodiments, the storage manager 140 can determine that a workflow activity is to be allocated based on a message from another client computing device 102, media agent 144, secondary storage device 136, or external computer reporting an error or other issue. For example, a secondary storage device 136 may send a message indicating that a backup cannot be completed within a predetermined time or that additional storage space is needed to complete the backup. In some embodiments, the workflow engines 161 send a message that a particular workflow activity has completed, succeeded, failed, timed out, or cannot be completed. In the event that the initial workflow activity cannot be completed as desired, the workflow activity that is to be allocated can be the initial workflow activity to another workflow engine 161.

If the storage manager 140 determines that there is not another workflow activity to be allocated, the storage manager 140 can end the routine 500, as illustrated at block 516. On the other hand, if the storage manager 140 determines that a workflow activity is to be allocated, the storage manager queries the workflow engines, as illustrated at block 512. The storage manager 140 can query the workflow engines 161 in a manner similar to that described above with reference to block 506.

At block 514, the storage manager 140 allocates the workflow activity or activities based on the allocation scheme. Similar to the description above with reference to block 508 and the allocation of the initial workflow activity, the storage manager 140 can allocate one or more workflow activities to one or more workflow engines based on the allocation scheme. The allocation scheme can take into account a variety of factors to determine how the workflow activities are to be allocated between the workflow engines 161. In some embodiments, the additional workflow activity can be allocated at the same time as the initial workflow activity, after the initial workflow activity has begun or has been completed, or upon the occurrence of some other event. Upon allocating the additional workflow activity 514, the storage manage can determine if there are any additional workflow activities to be allocated, as described in greater detail above with reference to block 510.

Additional, fewer, or different blocks can be used to implement the routine 500 without departing from the spirit and scope of the description. For example, in some embodiments, block 506 can be consolidated with block 512 and block 508 can be consolidated with block 514. In such embodiments, once the workflow suite is deployed to the workflow engines (block 504), the storage manager can determine if a workflow activity is to be allocated (block 510). The workflow activity can include the initial workflow activity. Once the storage manager 140 determines that a workflow activity is to be allocated, the storage manager 140 can proceed to blocks 512 and 514, as described in greater detail above.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method for allocating execution of a data management workflow suite within a networked data storage system, the method comprising:
   receiving relationship data, wherein the relationship data indicates an order in which data management activities are to be performed for at least first and second client computing devices having one or more processors;
   generating a data management workflow suite based at least in part on the received relationship data, the data management workflow suite comprising executable instructions for carrying out a plurality of data management activities;
   deploying the data management workflow suite to a workflow engine which executes on a second computing system comprising one or more processors;
   receiving an instruction to initiate the data management workflow suite;
   based at least in part on the instruction to initiate the data management workflow suite, causing the workflow engine to execute one or more data management activities, wherein executing the one or more data management activities comprises:
      identifying a first data agent for implementing at least one of the one or more data management activities to be performed for the first client computing device,
      identifying a second data agent for implementing at least one of the one or more data management activities to be performed for the second client computing device, and
      executing one or more data management activities to be performed for the first or second client computing devices; and
   based at least in part on the relationship data of the data management workflow suite, identifying a second data management activity of the data management workflow suite to execute.

2. The method of claim 1, wherein the plurality of data management activities further comprises one or more restore management activities in which data residing in a secondary storage is restored to a primary storage.

3. The method of claim 1, the method further comprising selecting the workflow engine according to an allocation scheme.

4. The method of claim 3, wherein the workflow engine is a first workflow engine, the method further comprising:
   deploying the data management workflow suite to a second workflow engine which executes on a separate computing system comprising one or more processors.

5. The method of claim 4, further comprising obtaining information related to activity levels associated with the workflow engine.

6. The method of claim 4, wherein deploying the data management workflow suite to the first workflow engine and the second workflow engine is based at least in part on one or more of computing resources associated with the first workflow engine and one or more of computing resources associated with the second workflow engine and geographic proximity of one or more components in a networked data management system to the first workflow engine and the second workflow engine.

7. The method of claim 3, wherein the allocation scheme and scheduling of the one or more data management activities are based, at least in part, on information related to activity levels associated with the first workflow engine and the second workflow engine.

8. The method of claim 5, wherein the allocation scheme is based at least in part on at least one of:
   computing resources associated with the first workflow engine and one or more of computing resources associated with the second workflow engine, physical proximity of the first workflow engine and the second workflow engine to other data storage system components, or communication pathway speeds between the other data storage system components and the first workflow engine and the second workflow engine.

9. The method of claim 7, wherein the information related to activity levels associated with the first workflow engine and the second workflow engine comprises information related to at least one of:
- a total number of workflow suites deployed on the first workflow engine and the second workflow engine,
- a total number of processes active on the first workflow engine and the second workflow engine, and
- utilization of the first workflow engine and the second workflow engine.

10. A data management system, comprising:
a first computing system executing on one or more processors and configured to:
- receive relationship data, wherein the relationship data indicates an order in which data management activities are to be performed for at least first and second client computing devices having one or more processors;
- generate a data management workflow suite based at least in part on the received relationship data, the data management workflow suite comprising executable instructions for carrying out a plurality of data management activities;
- deploy the data management workflow suite to a workflow engine which executes on a second computing system comprising one or more processors;
- receive an instruction to initiate the data management workflow suite;
- based at least in part on the instruction to initiate the data management workflow suite, cause the workflow engine to execute one or more data management activities, wherein executing the one or more data management activities comprises:
  - identifying a first data agent for implementing at least one of the one or more data management activities to be performed for the first client computing device,
  - identifying a second data agent for implementing at least one of the one or more data management activities to be performed for the second client computing device, and
  - executing one or more data management activities to be performed for the first or second client computing devices; and
- based at least in part on the relationship data of the data management workflow suite, identify a second data management activity of the data management workflow suite to execute.

11. The data management system of claim 10, wherein the plurality of data management activities further comprises one or more restore management activities in which data residing in a secondary storage is restored to a primary storage.

12. The data management system of claim 10, wherein the workflow engine is a first workflow engine, the first computing system further configured to:
deploy the data management workflow suite to a second workflow engine which executes on a separate computing system comprising one or more processors.

13. The data management system of claim 12, further comprising obtaining information related to activity levels associated with the workflow engine.

14. The data management system of claim 13, the first computing system further configured to: select the workflow engine according to an allocation scheme.

15. The data management system of claim 14, wherein the allocation scheme and scheduling of the one or more data management activities are based, at least in part, on information related to activity levels associated with the first workflow engine and the second workflow engine.

16. The data management system of claim 14, wherein deploying the data management workflow suite to the first workflow engine and the second workflow engine is based at least in part on one or more of computing resources associated with the first workflow engine and one or more of computing resources associated with the second workflow engine and geographic proximity of one or more components in the data management system to the first workflow engine and the second workflow engine.

17. The data management system of claim 14, wherein the allocation scheme is based at least in part on at least one of:
- computing resources associated with the first workflow engine and one or more of computing resources associated with the second workflow engine,
- physical proximity of the first workflow engine and the second workflow engine to other data storage system components, or
- communication pathway speeds between the other data storage system components and the first workflow engine and the second workflow engine.

18. The data management system of claim 15, wherein the information related to activity levels associated with the first workflow engine and the second workflow engine comprises information related to at least one of:
- a total number of workflow suites deployed on the first workflow engine and the second workflow engine,
- a total number of processes active on the first workflow engine and the second workflow engine, and
- utilization of the first workflow engine and the second workflow engine.

* * * * *